(12) United States Patent
Allmeier et al.

(10) Patent No.: US 7,369,383 B2
(45) Date of Patent: May 6, 2008

(54) PROTECTIVE CIRCUIT

(75) Inventors: Franz Allmeier, Mintraching (DE); Volker Karrer, Regensburg (DE); Thomas Reindl, Weiden (DE)

(73) Assignee: Siemens Aktiengesellschaft, Munich (DE)

( * ) Notice: Subject to any disclaimer, the term of this patent is extended or adjusted under 35 U.S.C. 154(b) by 92 days.

(21) Appl. No.: 10/987,170

(22) Filed: Nov. 12, 2004

(65) Prior Publication Data

US 2005/0094332 A1 May 5, 2005

Related U.S. Application Data

(63) Continuation of application No. PCT/DE03/01575, filed on May 15, 2003.

(30) Foreign Application Priority Data

May 17, 2002 (DE) ................. 102 22 149

(51) Int. Cl.
*H02H 5/04* (2006.01)
(52) U.S. Cl. ..................... 361/91.1; 361/23
(58) Field of Classification Search .......... 361/91.1, 361/93.7–93.9, 111, 20, 21, 23, 30, 33, 86
See application file for complete search history.

(56) References Cited

U.S. PATENT DOCUMENTS

| | | | | |
|---|---|---|---|---|
| 4,849,845 A * | 7/1989 | Schmitt | ...... | 361/56 |
| 5,179,494 A * | 1/1993 | Matsubara | ...... | 361/91.2 |
| 5,513,058 A * | 4/1996 | Hollenbeck | ...... | 361/36 |
| 5,986,902 A * | 11/1999 | Brkovic et al. | ...... | 363/50 |
| 6,078,156 A * | 6/2000 | Spurr | ...... | 318/368 |
| 6,917,502 B2 * | 7/2005 | Enzinna et al. | ...... | 361/72 |

FOREIGN PATENT DOCUMENTS

| | | |
|---|---|---|
| DE | 112 561 | 8/1974 |
| DE | 100 01 485 A1 | 7/2001 |
| FR | 2 738 086 A1 | 8/1995 |

* cited by examiner

*Primary Examiner*—Michael Sherry
*Assistant Examiner*—Danny Nguyen
(74) *Attorney, Agent, or Firm*—Baker Botts L.L.P.

(57) ABSTRACT

A protective circuit (1), particularly for overvoltage-protecting an electronic motor control unit, comprises a signal connection receiving and/or emitting an electrical signal, a switching element (4) which activates or deactivates a protective interrupter and is controllable via a control input, and a control circuit (5), the input side of which is connected to the signal connection while the output side thereof is connected to the control input of the switching element (4) in order to activate or deactivate the protective interrupter according to the electrical state at the signal connection. The control circuit (5) has a hysteresis characteristic regarding the electrical state at the signal connection.

25 Claims, 2 Drawing Sheets

PROTECTIVE CIRCUIT

CROSS REFERENCE TO RELATED APPLICATION

This application is a continuation of copending International Application No. PCT/DE03/01575 filed May 15, 2003 which designates the United States, and claims priority to German application no. 102 22 149.9 filed May 17, 2002.

TECHNICAL FIELD OF THE INVENTION

The present invention relates to a protective circuit, particularly for overvoltage protection of an electronic motor control unit for an internal combustion engine.

DESCRIPTION OF THE RELATED ART

A protective circuit of this type that protects the signal output of an electronic circuit against short-circuits, overcurrent and overvoltage is known from FR 2738086. This involves arranging a switching element in the ground lead of the protective circuit, said switching element disconnecting the ground lead in case of faults. This switching element is activated by means of a control circuit that measures the current and the voltage at the signal output and accordingly activates the switching element arranged in the ground lead.

In this case, the current is measured by a precision resistor arranged in the voltage line in which case the voltage dropping via the precision resistor shows the current flowing through the signal output. Therefore, the voltage dropping via the precision resistor is fed to a comparator that, on exceeding a preset limit value of the current, disconnects the switching element arranged in the ground lead, as a result of which the current is interrupted to prevent damage.

On the other hand, the voltage is measured by means of two differently dimensioned voltage dividers that are arranged between the voltage line and the ground lead in which case the center taps of the two voltage dividers are connected to the two inputs of an additional comparator that activates, depending on the voltage, the switching element activated in the ground lead. In this case, the two voltage dividers are dimensioned in such a way that the comparator through connects the switching element arranged in the ground lead within the normal voltage range.

However, in the case of a short circuit at the signal output, the center taps of the two voltage dividers supply the same voltage so that the comparator disconnects the switching element arranged in the ground lead.

In order to protect against an overvoltage, a Zener diode is connected in parallel to the resistor on the ground side on one of the two voltage dividers. The result of this is that the voltage at the center tap of this voltage divider cannot rise above the Zener voltage. As a result, should the voltage at the signal output in this case exceed that of the Zener voltage, the comparator will likewise disconnect the switching element arranged in the ground lead.

A disadvantage of this known protective circuit is its oscillation tendency in the case of overvoltages that fluctuate in the range of the switch-off voltage.

SUMMARY OF THE INVENTION

An object of the invention is to improve on the known protective circuit described above to the extent where the oscillation tendency in the case of overvoltage is reduced.

Taking the well-known initially described protective circuit as described above as the starting point, the object of the invention can be achieved by a protective circuit, particularly for overvoltage-protecting an electronic motor control unit, comprising a signal connection receiving and/or emitting an electrical signal, a switching element which activates or deactivates a protective interrupter in which case the switching element is controllable via a control input, and a control circuit, the input side of which is connected to the signal connection while the output side thereof is connected to the control input of the switching element in order to activate or deactivate the protective interrupter according to the electrical state at the signal connection, wherein the control circuit has a hysteresis characteristic regarding the electrical state at the signal connection.

The object can also be achieved by a protective circuit, particularly for overvoltage-protecting or overcurrent-protecting an electronic motor control unit, comprising a signal connection, a switching element which activates or deactivates a protective interrupter in which case the switching element is controllable via a control input, and a control circuit, the input side of which is connected to the signal connection while the output side thereof is connected to the control input of the switching element in order to activate or deactivate the protective interrupter according to the electrical state at the signal connection, wherein the control circuit features a hysteresis characteristic regarding the electrical state at the signal connection, the control circuit features a voltage measuring circuit to measure the input voltage at the signal connection, the control circuit features a threshold value unit to activate the protective interrupter if the input voltage exceeds a preset switch-off voltage and to deactivate the protective interrupter if the input voltage does not reach a preset switch-on voltage in which case the switch-on voltage and the switch-off voltage are different, the threshold value unit features an operational amplifier and a feedback resistor to generate the hysteresis characteristic, and wherein the signal connection receiving and/or emitting an electrical signal is embodied by a sensor at an electric device or by an electric device at a sensor and the inverting input of the operational amplifier is connected to the reference voltage source.

The invention is based on the technical knowledge that the oscillation tendency of the well-known initially described protective circuit is derived from the fact that the switching threshold of the comparator is alternately exceeded or not reached because of the voltage fluctuations occurring during operation.

The inventive control circuit therefore has an hysteresis characteristic in order to avoid such an oscillation tendency. This means that different limit values are provided for the activation or deactivation of a protective interrupter.

The protective interrupter is preferably activated or deactivated as a function of the voltage. In this case, the limit values for activating and deactivating the protective interrupter are different in order to achieve the hysteresis characteristic in accordance with the invention. Therefore, the control circuit in this variant of the invention has a voltage measuring circuit to measure the voltage at the signal connection.

In this case the voltage difference between the limit values for the voltage is preferably greater than the voltage fluctuations normally occurring during operation and/or the measuring accuracy to suppress reliably the oscillation tendency in voltages in the range of the limit values.

However, within the framework of the invention, it is also possible for the protective interrupter to be activated or deactivated as a function of the electrical current. In this case too the limit values for the activation and the deactivation of the protective interrupter are different in order to achieve the hysteresis characteristic according to the invention. Therefore the control circuit in this variant of the invention features a current measuring circuit to measure the electric current that flows through the signal connection.

In the case of such a current-controlled activation or deactivation of the protective interrupter, the difference between the limit values for the activation or deactivation of the protective interrupter is preferably greater than the current fluctuations normally occurring during operation and/or the measuring accuracy to suppress reliably the oscillation tendency in the case of currents in the range of the limit values.

However, with regards to activating or deactivating the protective interrupter, the invention is not restricted to current and voltage measurements. Instead it is possible for the protective interrupter to also be activated or deactivated as a function of other electrical variables with typical examples being the electrical power, the electric charge or the electrical energy that has flowed.

In the preferred embodiment of the invention, the voltage is measured by means of a voltage divider consisting of two resistors connected in series, with the voltage divider preferably being connected between the signal connection of the protective circuit and ground. The center tap of the voltage divider between the two resistors then provides the voltage for the voltage-controlled activation or deactivation of the protective interrupter.

In order to evaluate the measured voltage or the measured current, the control circuit preferably has a threshold value unit, the input side of which detects the specific measured quantity while the output side thereof activates the control element in order to activate or deactivate the protective interrupter.

The threshold value unit preferably compares the specific measured quantity with a lower limit value and an upper limit value in which case the protective interrupter is activated when the upper limit value is exceeded whereas the protective interrupter is deactivated if the specific measured quantity does not reach the lower limit value.

However, as an alternative it is also possible that the protective interrupter is already activated if the specific measured quantity exceeds the lower limit value whereas the protective interrupter is deactivated if the measured quantity does not again reach the upper limit value.

Such a threshold value unit can, for example, be switched by means of an operational amplifier in which case the one input of the operational amplifier is preferably connected to the center tap of a voltage divider whereas the other input of the operational amplifier is preferably connected to a reference voltage source. In order to activate or deactivate the protective interrupter, the limit values can then be set by suitably dimensioning the voltage divider and the reference voltage source.

When an operational amplifier is used as the threshold value unit, the hysteresis characteristic according to the invention can be achieved advantageously by connecting the output of the operational amplifier to one of the two inputs of the operational amplifier by means of a feedback loop. The feedback loop preferably consists of a resistor, the input side of which is preferably connected to the non-inverting input of the operational amplifier. However, as an alternative the resistor in a feedback line can also be connected to the inverting input of the operational amplifier in order to reach the desired hysteresis characteristic.

In addition a variant of the invention provides for the protective circuit to feature an error signal output at which an error signal is output which displays the activation or the deactivation of the protective interrupter.

The switching element for activating or deactivating the protective interrupter is preferably arranged in the voltage line of the protective circuit. However, as an alternative the switching element can also be arranged in the ground lead. In addition, it can also be advantageous to arrange a controllable switching element both in the ground lead and in the voltage line, said controllable switching element being activated in the way according to the invention in order to make possible a bipolar protective interrupter. Over and above this, the protective interrupter can also be implemented in another way known to the person skilled in the art.

Transistors, IGBTs, relays, FETs, MOSFETs, transmission gates or other semiconductor circuits are for example suitable as the switching element in order to activate the protective interrupter, but the invention is not restricted to these types of switching elements. It can for example be conceived that new types of switching elements will be developed in the future that can also be used in the same way.

It must also be said that the invention is not restricted to an input side protection of an electronic circuit. Instead it is also possible for the protective circuit according to the invention to now also be used to protect a signal output of an electronic circuit.

It is further possible for the protective circuit in accordance with the invention to optionally be integrated in the circuit to be protected or embodied as a separate component or device.

Finally, the term protective interrupter used within the framework of the invention should be understood in general terms, and, as well as complete disconnection or interruption, also includes the embodiments in the case in which only the electric connection to the protective circuit is changed by, for example, changing the input or output impedance.

BRIEF DESCRIPTION OF THE DRAWINGS

Other advantageous embodiments of the invention are characterized in the subclaims or are explained in greater detail below together with the description of the preferred embodiment on the basis of the accompanying drawings. They are as follows:

DETAILED DESCRIPTION OF THE PREFERRED EMBODIMENTS

Figure 1:
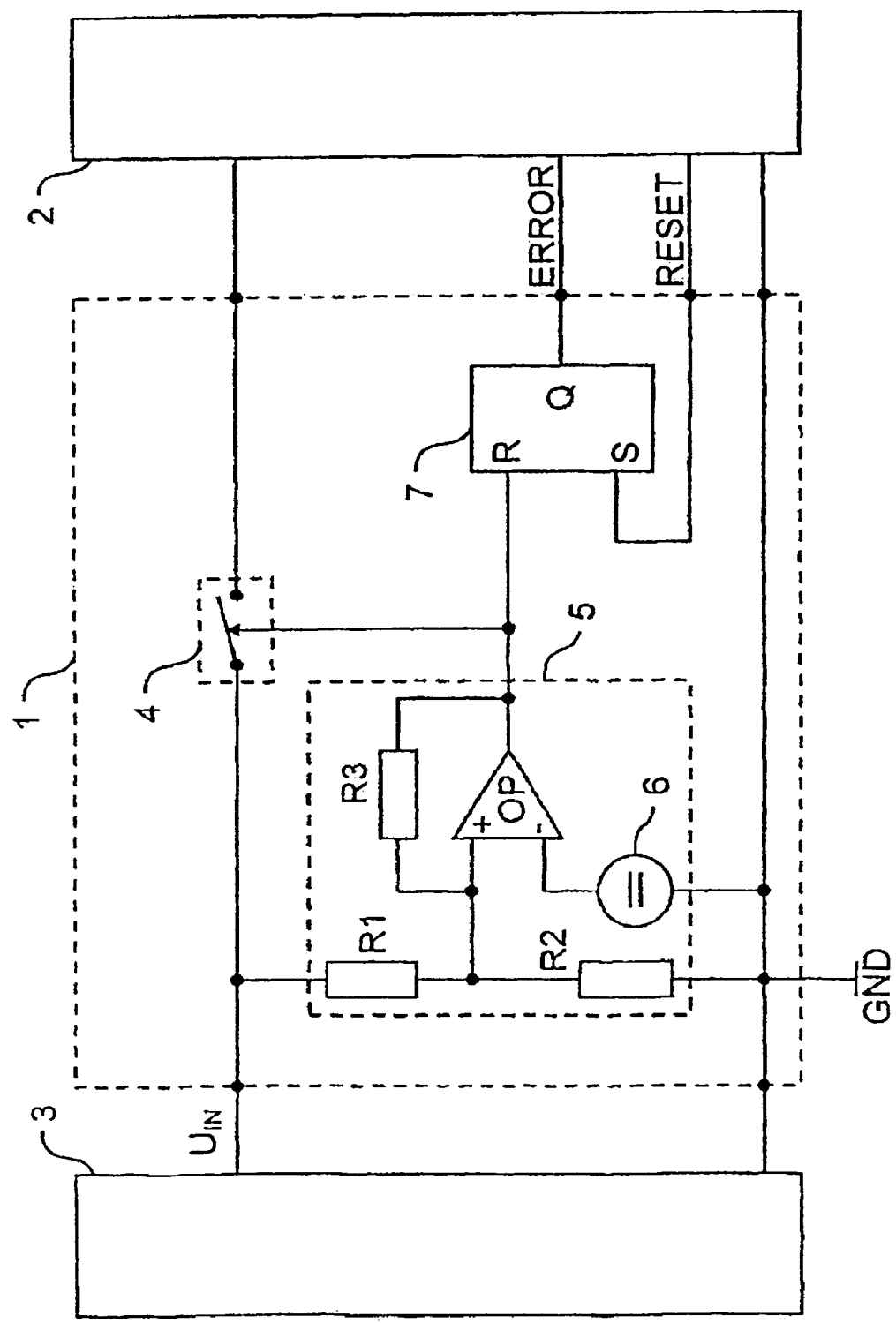
FIG. 1-A protective circuit according to the invention as a wiring diagram as well as FIGS. 2a and 2b-Switching diagrams of the protective circuit according to the invention in order to explain the hysteresis characteristic.

The block diagram in FIG. 1 shows a protective circuit 1 according to the invention that connects an electronic motor control unit 2 to a sensor 3, with the protective circuit 1 protecting the motor control unit 2 against a short circuit and an overvoltage on the side of the sensor 3.

To this end the protective circuit 1 has a controllable switching element 4 which is arranged in the voltage line and disconnects the sensor 3 from the motor control unit 2. Thus, in order to activate a protective interrupter, the switching element 4 disconnects, whereas to deactivate the protective interrupter the switching element 4 through connects.

The switching element 4 is activated by a control circuit 5 that measures the input voltage $U_{IN}$ and activates or deactivates the protective interrupter depending on the measured voltage.

To this end the control circuit 5 features a voltage divider that consists of two resistors R1, R2 that are connected in series on the sensor side between the voltage line and the ground lead.

Figure 2A:
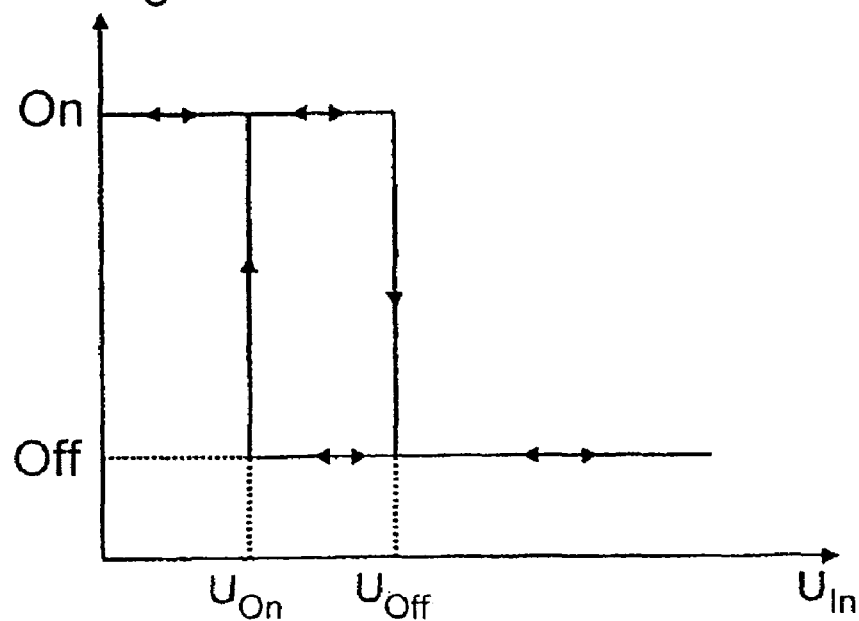
Figure 2B:
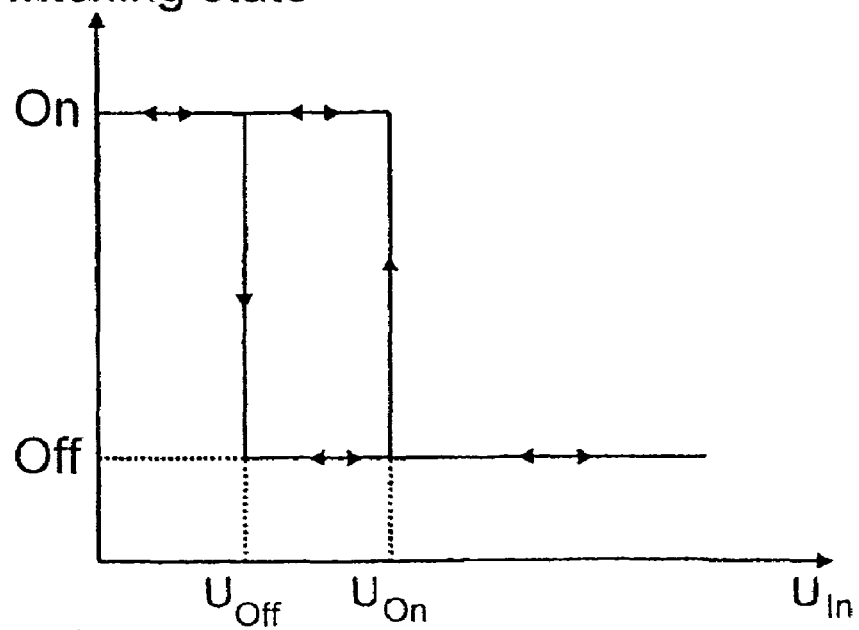

The center tap of the voltage divider between the two resistors R1 and R2 is connected to the non-inverting input of an operational amplifier OP which is used as a threshold value unit and compares the measured voltage with the preset limit values and activates the switching element 4 accordingly, as can also be seen in the switching diagrams in FIGS. 2a and 2b.

In order to determine a limit value, the inverting input of the operational amplifier OP is connected to ground via a reference voltage element 6. The operational amplifier OP thus disconnects the switching element 4 if the voltage at the center tap of the voltage divider between the two resistors R1, R2 exceeds the voltage of the reference voltage element 6.

In addition, the output of the operational amplifier OP is connected to the non-inverting input of the operational amplifier OP by means of a feedback loop, with a resistor R3 being arranged in the feedback loop. The feedback loop with the resistor R3 brings about a hysteresis characteristic of the operational amplifier OP so that the operational amplifier OP disconnects the switching element 4 if the input voltage $U_{IN}$ exceeds a preset limit value $U_{OFF}$, while the operational characteristic OP interconnects the switching element 4 if the input voltage $U_{IN}$ does not reach a preset limit value $U_{ON}$ as can be seen in FIG. 2a. In this case the limit value $U_{ON}$ for deactivating the protective interrupter is in this case less than the limit value $U_{OFF}$ for activating the protective interrupter in order to avoid an oscillation of the protective circuit 1 in the case of fluctuating input voltages $U_{IN}$.

Finally, the protective circuit 1 has an error signal output ERROR which is also connected to the motor control unit 2 to inform this unit about activating or deactivating the protective interrupter. For this purpose, the output side of an operational amplifier OP is connected to a reset input R of a flip-flop 7 which stores the control signal intermediately in order to activate or deactivate the protective interrupter, with the output Q of the flip-flop 7 being connected to the error signal output ERROR of the protective circuit 1. On the other hand, the set input S of the flip-flop 7 is connected to a reset input RESET of the protective circuit 1, with the reset input RESET being also connected to the motor control unit 2.

On the other hand, FIG. 2b is an alternative switching diagram in which the limit value $U_{OFF}$ for activating the protective interrupter is less than the limit value $U_{ON}$ for deactivating the protective interrupter.

The invention is not restricted to the embodiment described above. Instead, a plurality of variants and deviations that makes use of the idea of the invention and therefore falls within the scope covered by the invention is now possible.

We claim:

1. A circuit for protecting an electronic motor control unit, the circuit comprising:
   a signal connection receiving and/or emitting an electrical signal, a switching element which controllably couples and decouples the signal with an electronic motor control unit connection, wherein the switching element is controllable via a control input,
   a control circuit, the input side of which is connected to the signal connection while the output side thereof is connected to the control input of the switching element in order to open or close said switching element according to the electrical state at the signal connection, wherein the control circuit has a hysteresis characteristic regarding the electrical state at the signal connection,
   an error signal output connected to the output side of the control circuit, and
   wherein the control circuit comprises a threshold value unit to open said switching element if the input voltage exceeds a preset switch-off voltage and to close said switching element if the input voltage does not reach a preset switch-on voltage in which case the switch-on voltage and the switch-off voltage are different,
   the threshold value unit comprises an operational amplifier and a feedback resistor to generate the hysteresis characteristic, and wherein
   the signal connection is coupled with a sensor output and the inverting input of the operational amplifier is connected to a reference voltage source.

2. The protective circuit according to claim 1, wherein the control circuit has a voltage measuring circuit to measure the input voltage at the signal connection.

3. The protective circuit according to claim 2, wherein the voltage measuring circuit comprises a voltage divider.

4. The protective circuit according to claim 2, wherein the control circuit comprises a threshold value unit to open said switching element if the input voltage exceeds a preset switch-off voltage and to close said switching element if the input voltage does not reach a preset switch-on voltage in which case the switch-on voltage and the switch-off voltage are different.

5. The protective circuit according to claim 4, wherein the switch-off voltage exceeds the switch-on voltage.

6. The protective circuit according to claim 4, wherein the switch-off voltage does not reach the switch-on voltage.

7. The protective circuit according to claim 5, wherein the voltage difference between the switch-off voltage and the switch-on voltage is greater than the measuring accuracy of the voltage measuring circuit and/or the voltage fluctuations occurring during operation.

8. The protective circuit according to claim 6, wherein the voltage difference between the switch-off voltage and the switch-on voltage is greater than the measuring accuracy of the voltage measuring circuit and/or the voltage fluctuations occurring during operation.

9. The protective circuit according to claim 4, wherein the threshold value unit comprises an operational amplifier and a feedback resistor to generate the hysteresis characteristic.

10. The protective circuit according to claim 9, wherein the feedback resistor is arranged between the output of the operational amplifier and the non-inverting input of the operational amplifier.

11. The protective circuit according to claim 9, wherein the inverting input of the operational amplifier is connected to a reference voltage source.

12. The protective circuit according to claim 1, wherein the signal connection is coupled with a sensor output.

13. The protective circuit according to claim 1, wherein the switching element is a transistor, an IGBT, a FET, a MOSFET, a relay or a transmission gate.

14. The protective circuit according to claim 1, wherein a flip-flop is arranged between the control circuit and the error signal output to store the error signal.

15. The protective circuit according to claim 14, wherein the flip-flop has a reset input.

16. A circuit for overvoltage-protecting or overcurrent-protecting an electronic motor control unit, the circuit comprising:
- a signal connection receiving and/or emitting an electrical signal,
- a switching element which couples and decouples the signal connection with an electronic motor control unit connection, wherein the switching element is controllable via a control input,
- a control circuit, the input side of which is connected to the signal connection while the output side thereof is connected to the control input of the switching element in order to open or close said switching element according to the electrical state at the signal connection, and
- an error signal output connected to the output side of the control circuit, wherein:
- the control circuit comprises a hysteresis characteristic regarding the electrical state at the signal connection,
- the control circuit comprises a voltage measuring circuit to measure the input voltage at the signal connection,
- the control circuit comprises a threshold value unit to open said switching element if the input voltage exceeds a preset switch-off voltage and to close said switching element if the input voltage does not reach a preset switch-on voltage in which case the switch-on voltage and the switch-off voltage are different,
- the threshold value unit comprises an operational amplifier and a feedback resistor to generate the hysteresis characteristic, and wherein
- the signal connection is coupled with a sensor output and the inverting input of the operational amplifier is connected to a reference voltage source.

17. The protective circuit according to claim 16, wherein the voltage measuring circuit has a voltage divider.

18. The protective circuit according to claim 16, wherein the switch-off voltage exceeds the switch-on voltage.

19. The protective circuit according to claim 16, wherein the switch-off voltage does not reach the switch-on voltage.

20. The protective circuit according to claim 18, wherein the voltage difference between the switch-off voltage and the switch-on voltage exceeds the measuring accuracy of the voltage measuring circuit and/or the voltage fluctuations occurring during operation.

21. The protective circuit according to claim 19, wherein the voltage difference between the switch-off voltage and the switch-on voltage exceeds the measuring accuracy of the voltage measuring circuit and/or the voltage fluctuations occurring during operation.

22. The protective circuit according to claim 16, wherein the feedback resistor is arranged between the output of the operational amplifier and the non-inverting input of the operational amplifier.

23. The protective circuit according to claim 16, wherein the switching element is a transistor, an IGBT, a FET, a MOSFET, a relay or a transmission gate.

24. The protective circuit according to claim 16, wherein a flip-flop is arranged between the control circuit and the error signal output to store the error signal.

25. The protective circuit according to claim 24, wherein the flip-flop has a reset input.

* * * * *